(12) United States Patent
Niina et al.

(10) Patent No.: US 10,454,107 B2
(45) Date of Patent: Oct. 22, 2019

(54) POSITIVE ELECTRODE FOR NONAQUEOUS ELECTROLYTE SECONDARY BATTERY AND NONAQUEOUS ELECTROLYTE SECONDARY BATTERY

(71) Applicant: SANYO Electric Co., Ltd., Daito-shi, Osaka (JP)

(72) Inventors: Fumiharu Niina, Hyogo (JP); Takao Kokubu, Osaka (JP); Takeshi Ogasawara, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 268 days.

(21) Appl. No.: 15/125,881

(22) PCT Filed: Mar. 12, 2015

(86) PCT No.: PCT/JP2015/001377
§ 371 (c)(1),
(2) Date: Sep. 13, 2016

(87) PCT Pub. No.: WO2015/141194
PCT Pub. Date: Sep. 24, 2015

(65) Prior Publication Data
US 2017/0005333 A1    Jan. 5, 2017

(30) Foreign Application Priority Data

Mar. 20, 2014   (JP) .................................. 2014-057473

(51) Int. Cl.
*H01M 4/505*   (2010.01)
*H01M 4/36*   (2006.01)
(Continued)

(52) U.S. Cl.
CPC ........... *H01M 4/505* (2013.01); *H01M 4/131* (2013.01); *H01M 4/364* (2013.01); *H01M 4/366* (2013.01);
(Continued)

(58) Field of Classification Search
None
See application file for complete search history.

(56) References Cited

U.S. PATENT DOCUMENTS

| 2002/0071990 A1* | 6/2002 | Kweon | C01G 45/1228 429/231.1 |
| 2010/0209771 A1* | 8/2010 | Shizuka | B82Y 30/00 429/207 |

(Continued)

FOREIGN PATENT DOCUMENTS

| CN | 101997114 A | 3/2011 |
| CN | 102779991 A | 11/2012 |

(Continued)

OTHER PUBLICATIONS

International Search Report dated Jun. 2, 2015, issued in counterpart International Application No. PCT/JP2015/001377 (2 pages).

(Continued)

*Primary Examiner* — Wojciech Haske
(74) *Attorney, Agent, or Firm* — Westerman, Hattori, Daniels & Adrian, LLP

(57) ABSTRACT

A positive electrode for nonaqueous electrolyte secondary batteries and a nonaqueous electrolyte secondary battery are provided with which loss of initial efficiency can be limited even if a positive electrode exposed to air is used. An aspect of a positive electrode according to the present invention for nonaqueous electrolyte secondary batteries is a positive electrode for nonaqueous electrolyte secondary batteries incorporating a lithium transition metal oxide, wherein the
(Continued)

positive electrode for nonaqueous electrolyte secondary batteries contains a tungsten compound and a boron compound. It is particularly preferred that the tungsten compound be a tungsten-containing oxide.

6 Claims, 1 Drawing Sheet

(51) Int. Cl.
| | |
|---|---|
| *H01M 4/131* | (2010.01) |
| *H01M 4/525* | (2010.01) |
| *H01M 4/62* | (2006.01) |
| *H01M 4/58* | (2010.01) |
| *H01M 10/0525* | (2010.01) |
| *H01M 4/02* | (2006.01) |
| *H01M 4/04* | (2006.01) |
| *H01M 4/1391* | (2010.01) |
| *H01M 4/66* | (2006.01) |
| *H01M 10/052* | (2010.01) |

(52) U.S. Cl.
CPC .......... *H01M 4/525* (2013.01); *H01M 4/58* (2013.01); *H01M 4/5825* (2013.01); *H01M 4/62* (2013.01); *H01M 10/0525* (2013.01); *H01M 4/0404* (2013.01); *H01M 4/0435* (2013.01); *H01M 4/1391* (2013.01); *H01M 4/623* (2013.01); *H01M 4/625* (2013.01); *H01M 4/661* (2013.01); *H01M 10/052* (2013.01); *H01M 2004/028* (2013.01)

(56) References Cited

U.S. PATENT DOCUMENTS

| | | | |
|---|---|---|---|
| 2011/0003200 A1 | 1/2011 | Shizuka et al. | |
| 2011/0315918 A1* | 12/2011 | Kawai | H01M 4/525 252/182.1 |
| 2013/0277604 A1 | 10/2013 | Shimokita et al. | |
| 2015/0171424 A1* | 6/2015 | Kawai | H01M 4/366 429/223 |

FOREIGN PATENT DOCUMENTS

| | | |
|---|---|---|
| JP | 2000-11996 A | 1/2000 |
| JP | 2009-146739 A | 7/2009 |
| JP | 2009-289758 A | 12/2009 |
| JP | 2011-216214 A | 10/2011 |
| JP | 2013-239434 A | 11/2013 |
| JP | 2014-22329 A | 2/2014 |
| JP | 2014-35963 A | 2/2014 |
| JP | 2015-133318 A | 7/2015 |

OTHER PUBLICATIONS

English Translation of Chinese Search Report dated Mar. 2, 2018 issued in counterpart application No. 201580015206.4. (2 pages).

* cited by examiner

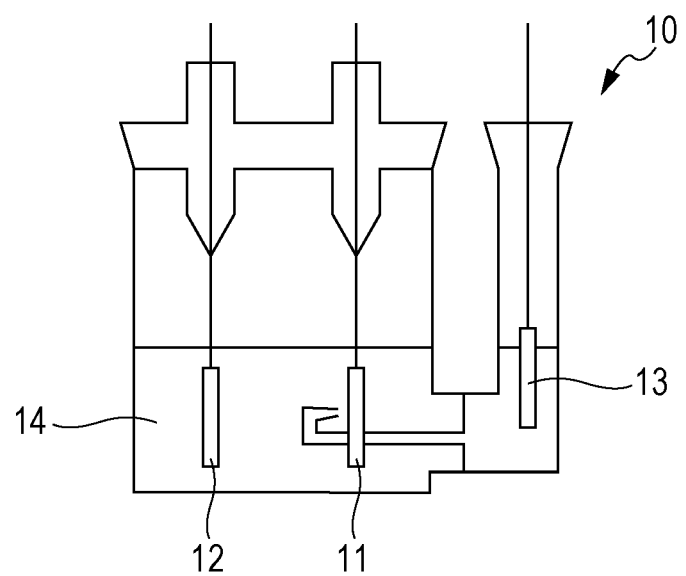

POSITIVE ELECTRODE FOR NONAQUEOUS ELECTROLYTE SECONDARY BATTERY AND NONAQUEOUS ELECTROLYTE SECONDARY BATTERY

TECHNICAL FIELD

The present invention relates to a positive electrode for nonaqueous electrolyte secondary batteries and a nonaqueous electrolyte secondary battery.

BACKGROUND ART

The rapid development of mobile information terminals such as cellphones, laptops, and smartphones into smaller and lighter ones in recent years has led to a need for higher-capacity secondary batteries as power supplies for driving them. Nonaqueous electrolyte secondary batteries, which charge and discharge through the movement of lithium ions between positive and negative electrodes in association with charging and discharging, are widely used as power supplies to drive such mobile information terminals because of their high energy density and high capacity.

More recently, nonaqueous electrolyte secondary batteries have been focused on as power supplies for the operation of electric tools, electric vehicles (EVs), and hybrid electric vehicles (HEVs and PHEVs) and are expected to be used in a broader range of fields. Such a power supply for machine operation needs to have an increased capacity that allows for extended use and improved output characteristics for repeated high-rate charge and discharge in a relatively short period. In particular, in applications such as electric tools, EVs, HEVs, and PHEVs, it is essential to achieve a high capacity while maintaining output characteristics during high-rate charge and discharge.

For example, PTL 1 below demonstrates that heating a positive electrode active material that contains lithium and at least one of nickel and cobalt with a boric acid compound attached thereto increases the capacity and improves the charge and discharge efficiency.

Furthermore, PTL 2 below indicates that dissolving tungsten in a lithium transition metal composite oxide and then adding boron improves the cycle characteristics.

CITATION LIST

Patent Literature

PTL 1: Japanese Published Unexamined Patent Application No. 2009-146739
PTL 2: Japanese Published Unexamined Patent Application No. 2013-239434

SUMMARY OF INVENTION

Technical Problem

However, it was found that even the technologies disclosed in PTL 1 and 2 above fail to limit loss of initial efficiency when the positive electrode active material or positive electrode is exposed to air.

According to an aspect of the present invention, an object is to provide a positive electrode for nonaqueous electrolyte secondary batteries and a positive electrode active material for nonaqueous electrolyte secondary batteries with which loss of initial efficiency can be limited even if a positive electrode active material or positive electrode exposed to air is used.

Solution to Problem

According to an aspect of the present invention, a positive electrode for nonaqueous electrolyte secondary batteries that incorporates a lithium transition metal oxide, wherein the positive electrode for nonaqueous electrolyte secondary batteries contains a tungsten compound and a boron compound.

According to an aspect of the present invention, a positive electrode for nonaqueous electrolyte secondary batteries contains a lithium transition metal oxide, a tungsten compound adhering to the surface of the lithium transition metal oxide, and a boron compound adhering to the surface of the lithium transition metal oxide.

Advantageous Effects of Invention

According to an aspect of the present invention, a positive electrode for nonaqueous electrolyte secondary batteries and a nonaqueous electrolyte secondary battery are provided with which loss of initial efficiency can be limited even if a positive electrode active material or positive electrode exposed to air is used.

BRIEF DESCRIPTION OF DRAWINGS

FIG. 1 is a schematic view of a three-electrode test cell used in this experiment.

DESCRIPTION OF EMBODIMENTS

The following describes an embodiment of the present invention. This embodiment is an example of implementing the present invention, and the present invention is not limited to this embodiment.

A positive electrode for nonaqueous electrolyte secondary batteries as an example of an embodiment of the present invention contains a lithium transition metal oxide, a tungsten compound, and a boron compound. The positive electrode is preferably composed of a positive electrode collector and a positive electrode mixture layer formed on the positive electrode collector. The positive electrode collector is, for example, a conductive thin-film body, in particular a foil of a metal or alloy that is stable in the range of positive electrode potentials, such as aluminum, or a film that has a surface layer of a metal such as aluminum. The positive electrode mixture layer preferably contains a binder and a conductive agent in addition to positive electrode active material particles.

The presence of the tungsten compound near the surface of the lithium transition metal oxide inhibits the reaction through which LiOH forms (more specifically, the reaction in which water existing on the surface of the lithium transition metal oxide and the lithium transition metal oxide react with each other, a reaction occurs through which Li and hydrogen in the surface layer of the lithium transition metal oxide are exchanged, and as a result Li is extracted from the lithium transition metal oxide to form LiOH), which is a cause of the degraded characteristics due to atmospheric exposure, thereby mitigating the degradation of initial charge and discharge characteristics associated with atmospheric exposure, or the loss of charge and discharge efficiency that occurs upon charge and discharge following atmospheric exposure. The atmospheric exposure herein means exposing a positive electrode active material or positive electrode to normal air, rather than to dehumidified air such as the dry atmosphere (a dew point of −30° C. or less).

Furthermore, the presence of the boron compound contained in the positive electrode reduces the surface energy of the lithium transition metal oxide and limits the adsorption of atmospheric water onto the lithium transition metal oxide. This effect is an interaction that is obtained when the boron compound coexists with a tungsten compound, and is considered to be lost if the boron compound does not coexist with a tungsten compound. The limited adsorption of water onto the lithium transition metal oxide also leads to reduced availability of water for the aforementioned LiOH-forming reaction. The LiOH-forming reaction as a cause of the degraded characteristics due to atmospheric exposure is therefore further inhibited, and this leads to further mitigated degradation of initial charge and discharge characteristics following atmospheric exposure. This sort of synergy prevents the LiOH-forming reaction as a cause of the degraded characteristics due to atmospheric exposure and, as a result, dramatically mitigates the degradation of initial charge and discharge characteristics associated with atmospheric exposure.

In the positive electrode for nonaqueous electrolyte secondary batteries as an example of this embodiment, furthermore, the positive electrode active material particles are preferably the lithium transition metal oxide with the tungsten and boron compounds adhering to the surface thereof. This enhances the aforementioned synergy between the tungsten and boron compounds, further improving the loss of initial charge and discharge characteristics due to atmospheric exposure.

The lithium transition metal composite oxide can be, in particular, a nickel-manganese, nickel-cobalt-manganese, nickel-cobalt, or nickel-cobalt-aluminum compound. Lithium nickel cobalt manganese oxide in particular can be one with a known composition such as one in which the molar ratio of nickel to cobalt to manganese is 5:2:3, 5:3:2, 6:2:2, 7:1:2, 7:2:1, or 8:1:1. It is particularly preferred to use a compound that contains at least nickel, more preferably one in which nickel is more abundant than cobalt and manganese, in particular one in which the difference in molar proportion between nickel and manganese is 0.2 or more when the total molar quantity of transition metals is 1, because this can further increase the capacity of the positive electrode. These can be used alone or in mixture.

The lithium transition metal oxide may contain other elements added thereto. Examples of elements to be added include magnesium (Mg), aluminum (Al), titanium (Ti), chromium (Cr), iron (Fe), copper (Cu), zinc (Zn), niobium (Nb), molybdenum (Mo), tantalum (Ta), zirconium (Zr), tin (Sn), sodium (Na), potassium (K), barium (Ba), strontium (Sr), and calcium (Ca).

The lithium transition metal oxide can be particles having an average particle diameter of 2 to 30 μm, and these particles may be in the form of secondary particles formed through the association of primary particles of 100 nm to 10 μm.

The tungsten compound contained in the positive electrode can be of any kind, and examples include tungsten oxide, lithium tungstate, sodium tungstate, potassium tungstate, barium tungstate, calcium tungstate, magnesium tungstate, cobalt tungstate, tungsten bromide, tungsten chloride, and tungsten carbide. Mixtures of two or more of these can also be used. In order to prevent impurities other than lithium and tungsten from being contained in the positive electrode active material, it is preferred to use a tungsten-containing oxide such as tungsten oxide or lithium tungstate. It is more preferred to use a tungsten compound in which tungsten has the most stable oxidation number of 6 in particular, such as $WO_3$ or $Li_2WO_4$.

The state where the tungsten compound is contained in the positive electrode is a state where the tungsten compound is present near the surfaces of particles of the lithium transition metal oxide as positive electrode active material particles, preferably scattered on and adhering to the surfaces, more preferably evenly scattered on and adhering to the surfaces.

In such a state, the inhibitory effect on the aforementioned LiOH-forming reaction is sufficiently inhibitory over the entire surfaces of the particles of the lithium transition metal oxide. If the amount of tungsten mixed is small, such actions and effects of tungsten as described above are insufficient. Too large an amount of tungsten, however, affects the charge and discharge characteristics of the battery because a large area on the surface of the lithium transition metal oxide is covered with the tungsten compound (too many sites coated). In the positive electrode active material according to the present invention, therefore, the amount of the tungsten compound in the positive electrode active material is preferably 0.05 mol % or more and 3.00 mol % or less, more preferably 0.10 mol % or more and 2.00 mol % or less, even more preferably 0.20 mol % or more and 1.50 mol % or less, on an elemental tungsten basis with respect to the total amount of transition metals in the lithium transition metal oxide.

A positive electrode that contains a tungsten compound can be produced by mechanically mixing a lithium transition metal oxide and a tungsten compound beforehand for adhesion, and also by adding a tungsten compound during the step of kneading a conductive agent and a binder.

The particle diameter of tungsten compound particles is preferably smaller than that of the lithium transition metal oxide, in particular, smaller than ¼. When the tungsten compound is larger than the lithium transition metal composite oxide, its area of contact with the lithium transition metal oxide may be so small that its effect is insufficient.

The boron compound contained in the positive electrode can be of any kind, preferably boric acid, lithium borate, lithium metaborate, or lithium tetraborate. Particularly preferred is lithium metaborate. The use of these boron compounds leads to more effective reduction of the loss of initial charge and discharge efficiency caused by atmospheric exposure.

The proportion of the boron compound in the positive electrode active material is preferably 0.05 mol % or more and 3.00 mol % or less, more preferably 0.10 mol % or more and 2.00 mol % or less, even more preferably 0.20 mol % or more and 1.50 mol % or less, on an elemental boron basis with respect to the total amount of transition metals in the lithium transition metal oxide. When this proportion is less than 0.05 mol %, the effect of the tungsten and boron compounds may be insufficient for the degradation of characteristics due to atmospheric exposure of electrode plates to be mitigated. When this proportion is more than 3.00 mol %, the amount of the positive electrode active material is accordingly small, and therefore the capacity of the positive electrode is low.

A positive electrode that contains a boron compound can be produced by mechanically mixing a lithium transition metal oxide and a boron compound beforehand for adhesion, and also by adding a boron compound during the step of kneading a conductive agent and a binder.

The particle diameter of boron compound particles is preferably smaller than the particle diameter of the lithium transition metal oxide, in particular, smaller than ¼. When the boron compound is larger than the lithium transition metal composite oxide, its area of contact with the lithium transition metal oxide may be so small that its effect is insufficient.

The boron compound only needs to be present in the vicinity of the tungsten compound, and this is enough for the aforementioned effect of the boron and tungsten compounds to be obtained. In other words, the boron compound may be adhering to the surfaces of the particles of the lithium transition metal oxide and may alternatively be present in the vicinity of the tungsten compound, rather than adhering to the surfaces, in the positive electrode. It is particularly preferred to attach the boron compound more selectively to the surfaces of the particles of the lithium transition metal oxide by mixing it with the lithium transition metal oxide beforehand or any other method. This enhances the synergy between the boron and tungsten compounds.

In a nonaqueous electrolyte secondary battery according to the present invention, such a positive electrode active material as described above may be used as a mixture with another positive electrode active material. The additional positive electrode active material to be mixed can be any compound to and from which lithium can be reversibly inserted and removed. For example, compounds such as those having a layered structure, a spinel structure, or an olivine structure to and from which lithium ions can be inserted and removed while maintaining a stable crystal structure can be used. When only a single positive electrode active material is used or different positive electrode active materials are used, the positive electrode active material or materials may have a constant particle diameter or different particle diameters.

The binder can be a material such as a fluorinated polymer or a rubber-like polymer. Examples of fluorinated polymers include polytetrafluoroethylene (PTFE), polyvinylidene fluoride (PVdF), and their modified forms, and examples of rubber-like polymers include ethylene-propylene-isoprene copolymers and ethylene-propylene-butadiene copolymers. These can be used alone, and it is also possible to use two or more of them in combination. The binder may be used in combination with a thickener such as carboxymethyl cellulose (CMC) or polyethylene oxide (PEO).

The conductive agent can be, for example, a carbon material, and examples include carbon materials such as carbon black, acetylene black, ketjen black, and graphite. These can be used alone, and it is also possible to use two or more of them in combination.

The positive electrode active material for nonaqueous electrolyte secondary batteries as an example of an embodiment of the present invention contains a lithium transition metal oxide, a tungsten compound adhering to the surface of the lithium transition metal oxide, and a boron compound adhering to the surface of the lithium transition metal oxide. The resulting synergy between the tungsten and boron compounds described above mitigates the degradation of initial charge and discharge characteristics associated with atmospheric exposure.

[Negative Electrode]

The negative electrode can be a conventional negative electrode and is obtained by, for example, mixing a negative electrode active material and a binder in water or any appropriate solvent, followed by application to a negative electrode collector, drying, and rolling. The negative electrode collector is preferably, for example, a conductive thin-film body, in particular a foil of a metal or alloy that is stable in the range of negative electrode potentials, such as copper, or a film that has a surface layer of a metal such as copper. The binder can be a material such as PTFE as in the positive electrode, but it is preferred to use a material such as a styrene-butadiene copolymer (SBR) or its modified form. The binder may be used in combination with a thickener such as CMC.

The negative electrode active material can be any material capable of reversibly storing and releasing lithium ions and can be, for example, a carbon material, a metal or alloy material that can be alloyed with lithium, such as Si or Sn, or a metal oxide. These can be used alone or as a mixture of two or more. Combinations of negative electrode active materials selected from carbon materials, metals or alloy materials that can be alloyed with lithium, and metal oxides can also be used.

[Nonaqueous Electrolyte]

The solvent for the nonaqueous electrolyte can be a conventional one, i.e., a cyclic carbonate such as ethylene carbonate, propylene carbonate, butylene carbonate, or vinylene carbonate or a linear carbonate such as dimethyl carbonate, methyl ethyl carbonate, or diethyl carbonate. It is particularly preferred to use a solvent mixture composed of cyclic and linear carbonates as a nonaqueous solvent highly conductive to lithium ions because of its high dielectric constant, low viscosity, and low melting point. The ratio by volume of the cyclic carbonate to the linear carbonate in this solvent mixture is preferably limited to the range of 2:8 to 5:5.

These solvents can be used in combination with, for example, ester-containing compounds such as methyl acetate, ethyl acetate, propyl acetate, methyl propionate, ethyl propionate, and γ-butyrolactone; compounds containing a sulfone group such as propanesultone; ether-containing compounds such as 1,2-dimethoxyethane, 1,2-diethoxyethane, tetrahydrofuran, 1,3-dioxane, 1,4-dioxane, and 2-methyltetrahydrofuran; nitrile-containing compounds such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and amide-containing compounds such as dimethylformamide. Solvents obtained through partial substitution of their hydrogen atoms H with fluorine atoms F can also be used.

The solute for the nonaqueous electrolyte can be a conventional solute, and examples include fluorine-containing lithium salts $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, and $LiAsF_6$. It is also possible to use a solute obtained by adding a lithium salt other than fluorine-containing lithium salts [a lithium salt that contains one or more of elements P, B, O, S, N, and Cl (e.g., $LiPO_2F_2$)] to a fluorine-containing lithium salt. It is particularly preferred that the solute include a fluorine-containing lithium salt and a lithium salt that contains an oxalato complex as anion because this ensures a stable coating is formed on the surface of the negative electrode even under high-temperature conditions.

Examples of such lithium salts that contain an oxalato complex as anion include LiBOB [lithium-bisoxalatoborate], $Li[B(C_2O_4)F_2]$, $Li[P(C_2O_4)F_4]$, and $Li[P(C_2O_4)_2F_2]$. Particularly preferred is LiBOB, which allows a stable coating to be formed on the negative electrode.

These solutes can be used alone, and it is also possible to use two or more of them in mixture.

[Separator]

The separator can be a conventional separator. For example, polypropylene or polyethylene separators, polypropylene-polyethylene multilayer separators, and separators with their surfaces coated with resin such as an aramid resin can be used.

There can be a conventional inorganic filler layer at the interface between the positive electrode and the separator or between the negative electrode and the separator. The filler can also be a conventional one, i.e., an oxide or phosphoric acid compound that contains one or more of elements such as titanium, aluminum, silicon, and magnesium or such a compound with its surface treated with a hydroxide or similar. The filler layer can be formed by, for example, applying filler-containing slurry directly to the positive electrode, negative electrode, or separator to form the layer or by attaching a sheet of the filler to the positive electrode, negative electrode, or separator.

EXPERIMENTAL EXAMPLES

The following describes an embodiment of the present invention in more detail by providing some experimental examples. These experimental examples are given to illustrate examples of a positive electrode for nonaqueous electrolyte secondary batteries, a nonaqueous electrolyte secondary battery, and a positive electrode active material for nonaqueous electrolyte secondary batteries that are provided to embody the technical ideas behind the present invention, and the present invention is in no way limited to these experimental examples. The present invention can be implemented with any necessary change unless its gist is altered.

First Experiment

Experimental Example 1

[Production of Positive Electrode Active Material]

First, a nickel-cobalt-manganese composite hydroxide [$Ni_{0.70}Co_{0.20}Mn_{0.10}$](OH)$_2$ obtained by coprecipitation was fired at 500° C. to give a nickel-cobalt-manganese composite oxide. Lithium hydroxide and the resulting nickel-cobalt-manganese composite oxide were mixed in Ishikawa's grinding mortar to make the molar ratio of lithium to all transition metals 1.05:1, and the mixture was fired at 900° C. for 10 hours in an air atmosphere and milled. In this way, a lithium-nickel-manganese-cobalt composite oxide $Li_{1.02}$[$Ni_{0.69}Co_{0.19}Mn_{0.098}$]$O_2$ was obtained with an average secondary particle diameter of approximately 18 μm.

Particles of this $Li_{1.02}$[$Ni_{0.69}Co_{0.19}Mn_{0.098}$]$O_2$ as positive electrode active material particles were mixed with tungsten oxide and lithium metaborate in predetermined proportions. In this way, a positive electrode active material was produced. The tungsten and boron content levels of the resulting positive electrode active material with respect to the total amount of transition metals in the lithium transition metal oxide were 0.5 mol % each.

[Production of Positive Electrode Plate]

The positive electrode active material particles, carbon black as a conductive agent, and a solution of polyvinylidene fluoride as a binder in N-methyl-2-pyrrolidone were weighed out to make the ratio by mass of the positive electrode active material particles to the conductive agent to the binder 95:2.5:2.5, and these were kneaded. Positive electrode mixture slurry was prepared in this way.

This positive electrode mixture slurry was then applied to both sides of an aluminum foil as a positive electrode collector, followed by drying of this, rolling with a roller, and attachment of an aluminum collector tab. In this way, a positive electrode plate was produced as a positive electrode collector with a positive electrode mixture layer formed on each side thereof.

The resulting positive electrode plate was observed under a scanning electron microscope (SEM), with the result that particles of tungsten oxide having an average particle diameter of 150 nm and particles of lithium metaborate having an average particle diameter of 500 nm were adhering to the surface of the lithium transition metal oxide. Part of the tungsten oxide and lithium metaborate may detach from the surfaces of the positive electrode active material particles during the step of mixing the conductive agent and the binder, and thus some tungsten oxide and lithium metaborate may be contained in the positive electrode not adhering to the positive electrode active material particles. The observation also confirmed that the lithium metaborate was adhering to the tungsten compound or present in the vicinity of the tungsten compound.

Then, as illustrated in FIG. 1, a three-electrode test cell was manufactured using a working electrode 11 that was the positive electrode produced in the way described above, a counter electrode 12 as a negative electrode and a reference electrode 13 each made of metallic lithium, and a nonaqueous liquid electrolyte 14 prepared by mixing ethylene carbonate, methyl ethyl carbonate, and dimethyl carbonate in a ratio by volume of 3:3:4, dissolving $LiPF_6$ in the resulting solvent mixture to a concentration of 1 mol/l, and then dissolving 1% by mass vinylene carbonate. The battery produced in this way is hereinafter referred to as battery A1.

[Production of Battery with Positive Electrode Plate Exposed to Air]

A battery with its positive electrode plate exposed to air (battery B1) was produced in the same way as battery A1 above except that in the production of the positive electrode plate, the rolling with a roller was followed by atmospheric exposure under the following conditions.

Atmospheric Exposure Conditions

Left in a thermo-hygrostat chamber at a temperature of 30° C. and a humidity of 50% for 15 days Experimental Example 2

A three-electrode test cell of Experimental Example 2 was manufactured in the same way as in Experimental Example 1 above except that in the production of the positive electrode active material in Experimental Example 1, lithium metaborate was not mixed into the particles of the $Li_{1.02}$[$Ni_{0.69}Co_{0.19}Mn_{0.098}$]$O_2$ above as positive electrode active material particles. The battery produced in this way is hereinafter referred to as battery A2.

A battery with its positive electrode plate exposed to air (battery B2) was produced in the same way as battery A2 above except that in the production of the positive electrode plate, the rolling with a roller was followed by atmospheric exposure under the above conditions.

Experimental Example 3

A three-electrode test cell of Experimental Example 3 was manufactured in the same way as in Experimental Example 1 above except that in the production of the positive electrode active material in Experimental Example 1, tungsten oxide was not mixed into the particles of the $Li_{1.02}$[$Ni_{0.69}Co_{0.19}Mn_{0.098}$]$O_2$ above as positive electrode active material particles. The battery produced in this way is hereinafter referred to as battery A3.

A battery with its positive electrode plate exposed to air (battery B3) was produced in the same way as battery A3 above except that in the production of the positive electrode plate, the rolling with a roller was followed by atmospheric exposure under the above conditions.

Experimental Example 4

A three-electrode test cell of Experimental Example 4 was manufactured in the same way as in Experimental Example 1 above except that in the production of the positive electrode active material in Experimental Example 1, tungsten oxide and lithium metaborate were not mixed into the particles of the $Li_{1.02}[Ni_{0.69}Co_{0.19}Mn_{0.098}]O_2$ above as positive electrode active material particles. The battery produced in this way is hereinafter referred to as battery A4.

A battery with its positive electrode plate exposed to air (battery B4) was produced in the same way as battery A4 above except that in the production of the positive electrode plate, the rolling with a roller was followed by atmospheric exposure under the above conditions.

<Measurement of Initial Charge and Discharge Efficiency>

The following charge and discharge test was performed using batteries A1 to A4, which were produced with their positive electrode plates not exposed to air under the above conditions, and batteries B1 to B4, which were produced in the same way as batteries A1 to A4 but with their positive electrode plates exposed to air under the above conditions, to measure the initial charge and discharge efficiency of each battery.

Charging Conditions in Cycle 1

Under 25° C. temperature conditions, constant-current charging was performed at a current density of 0.2 mA/cm$^2$ to 4.3 V (vs. Li/Li$^+$), and constant-voltage charging was performed at a constant voltage of 4.3 V (vs. Li/Li$^+$) until the current density reached 0.04 mA/cm$^2$.

Discharging Conditions in Cycle 1

Under 25° C. temperature conditions, constant-current discharge was performed at a current density of 0.2 mA/cm$^2$ to 2.5 V (vs. Li/Li$^+$).

Halt

The duration of the halt between the above charging and discharge was 5 minutes.

With charging and discharge under the above conditions constituting one cycle, the initial charge and discharge efficiency in Cycle 1 was determined from the measured charge and discharge capacities on the basis of formula (1) below.

Initial charge and discharge efficiency (%)=Discharge capacity/Charge capacity×100  (1)

<Calculation of Exposure Degradation Index>

Of the initial charge and discharge efficiencies determined above, the initial charge and discharge efficiency without atmospheric exposure (with the positive electrode plate not exposed to air) was defined as "unexposed initial efficiency," and the initial charge and discharge efficiency with atmospheric exposure (with the positive electrode plate exposed to air) was defined as "exposed initial efficiency." The exposure degradation index was calculated from the difference between the unexposed and exposed initial efficiencies of the paired batteries on the basis of formula (2) below.

Exposure degradation index=(Unexposed initial efficiency)−(Exposed initial efficiency)  (2)

The results are summarized in Table 1 below.

TABLE 1

|  | Tungsten oxide added | Lithium metaborate added | Atmospheric exposure degradation index (Unexposed initial efficiency - Exposed initial efficiency) (%) |
|---|---|---|---|
| Experimental Example 1 | Yes | Yes | 0.3 |
| Experimental Example 2 | Yes | No | 1.5 |
| Experimental Example 3 | No | Yes | 2.1 |
| Experimental Example 4 | No | No | 1.8 |

As can be seen from the results in Table 1 above, the batteries of Experimental Example 1, in which tungsten oxide and lithium metaborate were adhering to the surfaces of particles of a lithium transition metal oxide, exhibited a greatly reduced exposure degradation index compared with the batteries of Experimental Examples 2 to 4. The batteries of Experimental Example 2, in which only tungsten oxide was attached, and the batteries of Experimental Example 3, in which only lithium metaborate was attached, were comparable to the batteries of Experimental Example 4, which contained neither of them, in terms of atmospheric exposure degradation index. However, the batteries of Experimental Example 1, which combined the configurations of the batteries of Experimental Examples 2 and 3, demonstrated an improvement much greater than the individual effects. These results can be explained as follows.

In the case of the batteries of Experimental Example 1, in which both tungsten oxide and lithium metaborate are adhering to the surface of a lithium transition metal oxide, the tungsten oxide inhibits the progress of the reaction through which LiOH forms (more specifically, the reaction in which water existing on the surface of the lithium transition metal oxide and the lithium transition metal oxide react with each other, a reaction occurs through which Li and hydrogen in the surface layer of the lithium transition metal oxide are exchanged, and as a result Li is extracted from the lithium transition metal oxide to form LiOH), which is a cause of the degraded characteristics due to atmospheric exposure. This presumably mitigates the degradation of initial charge and discharge characteristics associated with atmospheric exposure, or the loss of charge and discharge efficiency that occurs upon charge and discharge following atmospheric exposure.

Furthermore, reduced surface energy of the lithium transition metal oxide limits the adsorption of atmospheric water onto the lithium transition metal compound. This decreased amount of adsorbed water presumably leads to further inhibition of the progress of the aforementioned LiOH-forming reaction, a cause of the degraded characteristics due to atmospheric exposure, further mitigating the degradation of initial charge and discharge characteristics following atmospheric exposure. This sort of synergy inhibits the LiOH-forming reaction as a cause of the degraded characteristics due to atmospheric exposure and, as a result, dramatically mitigates the degradation of initial charge and discharge characteristics associated with atmospheric exposure, or the loss of charge and discharge efficiency that occurs upon charge and discharge following atmospheric exposure.

The aforementioned interaction between boron and tungsten compounds is an action of the boron compound that occurs when the boron compound coexists with a tungsten compound, and is considered to be lost when the boron compound exists alone.

When the batteries of Experimental Example 2, in which only tungsten oxide was adhering to the surfaces of particles of a lithium transition metal oxide, were compared with those of Experimental Example 1, in which tungsten oxide and lithium metaborate were adhering, the reduction of the loss of charge and discharge efficiency that occurs upon charge and discharge following atmospheric exposure was insufficient in the case of the former. This can be explained as follows. The presence of tungsten oxide slightly inhibits the aforementioned LiOH-forming reaction as a cause of the degradation of atmospheric exposure, but due to the absence of a boron compound, the surface energy of the lithium transition metal oxide is not reduced. As a result, a large amount of water is adsorbed onto the surface of the lithium transition metal oxide. The resulting accelerated progress of the aforementioned LiOH-forming reaction as a cause of the degradation of atmospheric exposure presumably led to the degradation of initial charge and discharge characteristics following atmospheric exposure being only insufficiently mitigated.

In the case of the batteries of Experimental Example 3, too, in which only lithium metaborate was adhering, the initial charge and discharge characteristics following atmospheric exposure were not mitigated. This can be explained as follows. As stated, the adsorption of atmospheric water onto the lithium transition metal oxide is not reduced when the lithium metaborate exists alone rather than coexisting with a tungsten oxide compound. The presence of lithium metaborate alone led to accelerated progress of the aforementioned LiOH-forming reaction. Furthermore, the batteries of Experimental Example 3 contained no tungsten compound and therefore lacked the inhibitory effect of a tungsten compound on the aforementioned LiOH-forming reaction. These results indicate that simply attaching a boron compound as in Experimental Example 3 is not effective in mitigating the degradation of initial charge and discharge characteristics associated with atmospheric exposure.

In the case of the batteries of Experimental Example 4, both tungsten oxide and lithium metaborate were not adhering to the surface of a lithium transition metal oxide. Thus neither the effect of tungsten oxide nor the synergy between tungsten oxide and lithium metaborate was obtained. Presumably because of this, the aforementioned reaction through which LiOH forms was not inhibited, and the degradation of initial charge and discharge characteristics associated with atmospheric exposure was not mitigated.

Second Experiment

Experimental Example 5

A three-electrode test cell of Experimental Example 5 was manufactured in the same way as in Experimental Example 1 above except that the nickel-cobalt-manganese composite, lithium hydroxide, and nickel-cobalt-manganese composite oxide used in Experimental Example 1 and tungsten oxide ($WO_3$) were mixed and fired in Ishikawa's grinding mortar to make the molar ratio of lithium to all transition metals, or nickel, cobalt, and manganese, to tungsten 1.02:1:0.005. The battery produced in this way is hereinafter referred to as battery A5. For this lithium-nickel-manganese-cobalt composite oxide, a change in lattice volume from that of the tungsten-free lithium-nickel-cobalt-manganese composite oxide $Li_{1.02}[Ni_{0.69}Co_{0.19}Mn_{0.098}]O_2$ confirmed that tungsten had been dissolved in the crystals.

A battery with its positive electrode plate exposed to air (battery B5) was produced in the same way as battery 5 above except that in the production of the positive electrode plate, the rolling with a roller was followed by atmospheric exposure under the above conditions.

The exposure degradation index was calculated in the same way as in First Experiment above using battery A5, which was produced with its positive electrode plate not exposed to air under the above conditions, and battery B5, which was produced in the same way as battery A5 but with its positive electrode plate exposed to air under the above conditions. The results are summarized in Table 2 below along with results from the batteries of Experimental Examples 1 and 4.

TABLE 2

| | Tungsten oxide added | Lithium metaborate added | Atmospheric exposure degradation index (Unexposed initial efficiency - Exposed initial efficiency) (%) |
|---|---|---|---|
| Experimental Example 1 | Yes | Yes | 0.3 |
| Experimental Example 4 | No | No | 1.8 |
| Experimental Example 5 | Yes (dissolved) | Yes | 2.5 |

When the initial efficiency with a positive electrode plate not exposed to air in Experimental Example 4 was defined as 100%, the initial efficiency in Experimental Example 5 was as low as 92%.

As can be seen from the results in Table 2 above, the batteries of Experimental Example 5, in which tungsten oxide was mixed with lithium hydroxide and a transition metal oxide in the production of the lithium transition metal oxide, experienced a great degradation of initial charge and discharge characteristics upon exposure to air compared with the batteries of Experimental Example 4, in which both tungsten oxide and lithium metaborate were not adhering to the surface of a lithium transition metal oxide. This can be explained by the presence of the oxide of tungsten in the firing of lithium hydroxide and the transition metal oxide. The oxide of tungsten presumably affected the reactivity between lithium hydroxide and the transition metal oxide, resulting in a LiOH increase. Another possible reason is that tungsten was dissolved in the lithium transition metal oxide. The resulting lack of interactions between the boron and tungsten compounds presumably led to the failure to inhibit the aforementioned reaction through which LiOH forms, hence the failure to mitigate the degradation of initial charge and discharge characteristics associated with atmospheric exposure.

Third Experiment

Experimental Example 6

A battery was produced in the same way as battery A1 above except that in the production of the positive electrode active material in Experimental Example 1, the boron compound was lithium tetraborate instead of lithium metaborate. The battery produced in this way is hereinafter referred to as battery A6.

A battery paired with battery A6 and having its positive electrode plate exposed to air (battery B6) was produced in the same way as battery A5 above except that in the production of the positive electrode plate, the rolling with a roller was followed by atmospheric exposure under the above conditions.

Experimental Example 7

A battery was produced in the same way as battery A3 above except that in the production of the positive electrode active material in Experimental Example 3, the boron compound was lithium tetraborate instead of lithium metaborate. The battery produced in this way is hereinafter referred to as battery A7.

A battery paired with battery A7 and having its positive electrode plate exposed to air (battery B7) was produced in the same way as battery A7 above except that in the production of the positive electrode plate, the rolling with a roller was followed by atmospheric exposure under the above conditions.

The exposure degradation index was calculated in the same way as in First Experiment above using the batteries of battery A6 and battery A7, which were produced with their positive electrode plates not exposed to air under the above conditions, and batteries B6 and B7, which were produced in the same way as batteries A6 and A7 but with their positive electrode plates exposed to air under the above conditions. The results are summarized in Table 3 below along with results from the batteries of Experimental Examples 1 and 3.

TABLE 3

| | Tungsten oxide added | Boron compound added | Atmospheric exposure degradation index (Unexposed initial efficiency - Exposed initial efficiency) (%) |
|---|---|---|---|
| Experimental Example 1 | Yes | Lithium metaborate | 0.3 |
| Experimental Example 3 | No | Lithium metaborate | 2.1 |
| Experimental Example 6 | Yes | Lithium tetraborate | 0.5 |
| Experimental Example 7 | No | Lithium tetraborate | 2.0 |

As can be seen from the results in Table 3 above, the batteries of Experimental Example 6, in which lithium tetraborate rather than lithium metaborate was attached to part of the surface of a lithium transition metal oxide, exhibited a greatly reduced exposure degradation index compared with the batteries of Experimental Example 7, which was paired with the batteries of Experimental Example 6 and in which no tungsten compound was attached.

These results indicate that lithium tetraborate has effects equivalent to those lithium metaborate has, and this consequence is considered to be a common effect that is obtained with any compound that contains boron. When the results of the batteries of Experimental Examples 1 and 6 are compared, the batteries of Experimental Example 1 exhibited a lower exposure degradation index than the batteries of Experimental Example 6. This indicates that among other boron compounds, lithium metaborate is particularly preferred.

INDUSTRIAL APPLICABILITY

The positive electrode according to an aspect of the present invention for nonaqueous electrolyte secondary batteries and nonaqueous electrolyte secondary batteries incorporating it can be applied to power supplies for mobile information terminals such as cellphones, laptops, smartphones, and tablet terminals, particularly in applications in which a high energy density is required. They are also expected to expand into high-power applications such as electric vehicles (EVs), hybrid electric vehicles (HEVs and PHEVs), and electric tools.

REFERENCE SIGNS LIST

10 . . . Three-electrode test cell
11 . . . Working electrode (positive electrode)
12 . . . Counter electrode (negative electrode)
13 . . . Reference electrode
14 . . . Nonaqueous liquid electrolyte

The invention claimed is:

1. A positive electrode for a nonaqueous electrolyte secondary battery, the positive electrode comprising lithium nickel cobalt manganese oxide, wherein the positive electrode for a nonaqueous electrolyte secondary battery contains particles of tungsten compound and particles of boron compound, and
   the particles of tungsten compound and the particles of boron compound being adhered to at least part of a surface of the lithium nickel cobalt manganese oxide.

2. The positive electrode according to claim 1 for a nonaqueous electrolyte secondary battery, wherein the tungsten compound comprises a tungsten-containing oxide.

3. The positive electrode according to claim 1 for a nonaqueous electrolyte secondary battery, wherein the at least one boron compound comprises at least one selected from boric acid, lithium borate, lithium metaborate, and lithium tetraborate.

4. A nonaqueous electrolyte secondary battery comprising a positive electrode according to claim 1 for a nonaqueous electrolyte secondary battery.

5. The positive electrode according to claim 1 for a nonaqueous electrolyte secondary battery, wherein the molar ratio of nickel is higher than the molar ratio of cobalt, and the molar ratio of nickel is higher than the molar ratio of manganese in the lithium nickel cobalt manganese oxide.

6. The positive electrode according to claim 5 for a nonaqueous electrolyte secondary battery, wherein the difference in molar ratio between nickel and manganese is 0.2 or more when the total molar quantity of transition metals is 1.

* * * * *